(12) United States Patent
Phipps

(10) Patent No.: US 12,466,039 B1
(45) Date of Patent: Nov. 11, 2025

(54) DRYER VENT OUTPUT HOSE ATTACHMENT DEVICE

(71) Applicant: Robert Phipps, McMinnville, OR (US)

(72) Inventor: Robert Phipps, McMinnville, OR (US)

( * ) Notice: Subject to any disclaimer, the term of this patent is extended or adjusted under 35 U.S.C. 154(b) by 0 days.

(21) Appl. No.: 19/185,383

(22) Filed: Apr. 22, 2025

Related U.S. Application Data

(60) Provisional application No. 63/782,657, filed on Apr. 3, 2025.

(51) Int. Cl.
| | |
|---|---|
| *B25B 27/02* | (2006.01) |
| *B25G 1/04* | (2006.01) |
| *B25G 1/10* | (2006.01) |
| *D06F 58/20* | (2006.01) |

(52) U.S. Cl.
CPC ............. *B25B 27/02* (2013.01); *B25G 1/04* (2013.01); *B25G 1/10* (2013.01); *D06F 58/20* (2013.01)

(58) Field of Classification Search
CPC .. B25B 27/02; B25G 1/04; B25G 1/10; D06F 58/20; F16L 37/26; F16L 37/004
See application file for complete search history.

(56) References Cited

U.S. PATENT DOCUMENTS

| | | | | |
|---|---|---|---|---|
| 5,257,468 A | * | 11/1993 | Lebrun | D06F 58/00 34/235 |
| 5,318,328 A | * | 6/1994 | Dawson | F16L 37/004 285/903 |
| 5,653,631 A | * | 8/1997 | Andersen | F24F 13/0209 454/339 |
| 6,195,910 B1 | * | 3/2001 | Robineau | F26B 21/00 34/607 |
| 6,463,673 B1 | * | 10/2002 | Gherna | D06F 58/20 34/235 |
| 7,421,804 B1 | * | 9/2008 | Hession | D06F 58/20 34/601 |
| 7,603,792 B1 | * | 10/2009 | McDonald | F16L 47/26 34/235 |
| 10,145,054 B2 | * | 12/2018 | Federico | D06F 58/20 |
| 2004/0237330 A1 | * | 12/2004 | Fuller | D06F 58/20 34/140 |
| 2009/0151186 A1 | | 6/2009 | Filmore | |

* cited by examiner

*Primary Examiner* — Bayan Salone
(74) *Attorney, Agent, or Firm* — Brennan, Manna & Diamond, LLC

(57) ABSTRACT

A dryer vent output hose attachment device is provided. The device is comprised of a tool designed to simplify the connection of a flexible dryer vent hose to a rear-facing vent port on a dryer, particularly within constrained or recessed spaces. The device comprises a handle connected to an angle adapter that redirects force perpendicularly, enabling alignment and attachment of the vent hose from an accessible vantage point. The adapter interfaces with a permanently affixed attachment point on the hose using a secure, tool-free reciprocating fastening mechanism. In embodiments where the handle is removably attached, a release mechanism with an internal latch permits handle removal post-installation.

8 Claims, 5 Drawing Sheets

DRYER VENT OUTPUT HOSE ATTACHMENT DEVICE

CROSS-REFERENCE TO RELATED APPLICATION

The present application claims priority to, and the benefit of, U.S. Provisional Application No. 63/782,657, which was filed on Apr. 3, 2025, and is incorporated herein by reference in its entirety.

FIELD OF THE INVENTION

The present invention relates generally to the field of dryer vent hoses. More specifically, the present invention relates to a tool designed to simplify the connection of a flexible dryer vent hose to a rear-facing vent port on a dryer, particularly within constrained or recessed spaces. Accordingly, the present disclosure makes specific reference thereto. Nonetheless, it is to be appreciated that aspects of the present invention are also equally applicable to other like applications, devices, and methods of manufacture.

BACKGROUND

In residential and commercial laundry installations, connecting a dryer vent hose to the dryer port presents both logistical and ergonomic challenges. The process typically requires users to maneuver behind the dryer unit, which is often installed in confined spaces with limited access. This positioning can lead to discomfort, physical strain, and in some cases, injury. Additionally, incorrect or incomplete connections due to poor visibility and restricted reach can result in kinking of the vent hose. A kinked hose impairs airflow, leading to inefficient dryer operation, overheating, and potential damage to internal components. The accumulation of lint and heat in obstructed hoses may also create a fire hazard. Standard hose attachment methods rely heavily on manual dexterity and clear sightlines, both of which are compromised in typical laundry room setups. As a result, users often encounter unnecessary complications when attempting to complete a routine maintenance task.

Therefore, there exists a long-felt need in the art for a dryer vent output hose attachment device that enables secure hose-to-dryer connections without requiring users to access the space behind the appliance. There also exists a long-felt need in the art for a dryer vent output hose attachment device that reduces the physical strain and injury risk associated with traditional dryer hose installations. Moreover, there exists a long-felt need in the art for a dryer vent output hose attachment device that ensures reliable airflow by minimizing the occurrence of hose kinks during repositioning of the dryer.

The subject matter disclosed and claimed herein, in one embodiment thereof, comprises a dryer vent output hose attachment device. The device is comprised of a tool designed to simplify the connection of a flexible dryer vent hose to a rear-facing vent port on a dryer, particularly within constrained or recessed spaces. The device comprises a handle connected to an angle adapter that redirects force perpendicularly, enabling alignment and attachment of the vent hose from an accessible vantage point. The adapter interfaces with a permanently affixed attachment point on the hose using a secure, tool-free reciprocating fastening mechanism. In embodiments where the handle is removably attached, a release mechanism with an internal latch permits handle removal post-installation. The device also comprises a method of use allowing the user to connect the vent hose while the dryer remains in or near its final position, eliminating the need for awkward physical positioning or rear access during installation.

In this manner, the dryer vent output hose attachment device of the present invention accomplishes all the foregoing objectives and provides a tool that allows a user to connect a dryer vent hose from a comfortable and accessible position from the front or side of the dryer while aligning and securing the hose connection. The incorporation of reciprocating fastening mechanisms, such as snap connectors or magnets, ensures a reliable and user-friendly interface between the hose and dryer vent port. As a result, the dryer vent output hose attachment device promotes safer, more efficient dryer installations and mitigates risks associated with restricted airflow and improper hose connections.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a dryer vent output hose attachment device. The dryer vent output hose attachment device is a manually operated tool designed to assist in connecting a flexible dryer vent hose to a dryer vent port located on the rear of a dryer, particularly in recessed or obstructed areas. The device enables hose connection from a more accessible position, such as the front or side of the dryer, minimizing the need for awkward positioning.

The device is comprised of a handle that enables controlled linear force transfer. The handle is affixed to an angular adapter configured to redirect the insertion force perpendicular to the handle's axis, allowing the user to align and connect the vent hose without accessing the rear of the appliance. The adapter is configured to engage with an attachment point affixed to the terminal end of the vent hose. The adapter and attachment point are designed to be diameter-compatible with standard vent hose sizes.

The configuration of the handle and adapter permits maneuvering and hose connection while the user remains in a comfortable standing or kneeling position. The user can align and attach the adapter to the fixed attachment point on the hose, completing the connection without moving behind the dryer.

The connection between the adapter and the attachment point is secured using a reciprocating fastening mechanism, which may include bayonet-style interfaces, magnetic couplers, spring-loaded latches, threaded collars, snap-fit clips, or other tool-free locking mechanisms designed to ensure secure and repeatable attachment.

The invention further includes a method of use involving attaching the adapter to the dryer vent port, grasping and extending the handle as needed, maneuvering the adapter into alignment with the hose's attachment point, securing the connection, pushing the dryer into position, and optionally removing the handle is designed to detach in one embodiment.

Accordingly, the dryer vent output hose attachment device of the present invention is particularly advantageous as it provides a tool that allows a user to connect a dryer vent hose from a comfortable and accessible position from the front or side of the dryer while aligning and securing the hose connection. The incorporation of reciprocating fastening mechanisms such as snap connectors or magnets, ensures a reliable and user-friendly interface between the hose and dryer vent port. As a result, the dryer vent output hose attachment device promotes safer, more efficient dryer installations and mitigates risks associated with restricted airflow and improper hose connections.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
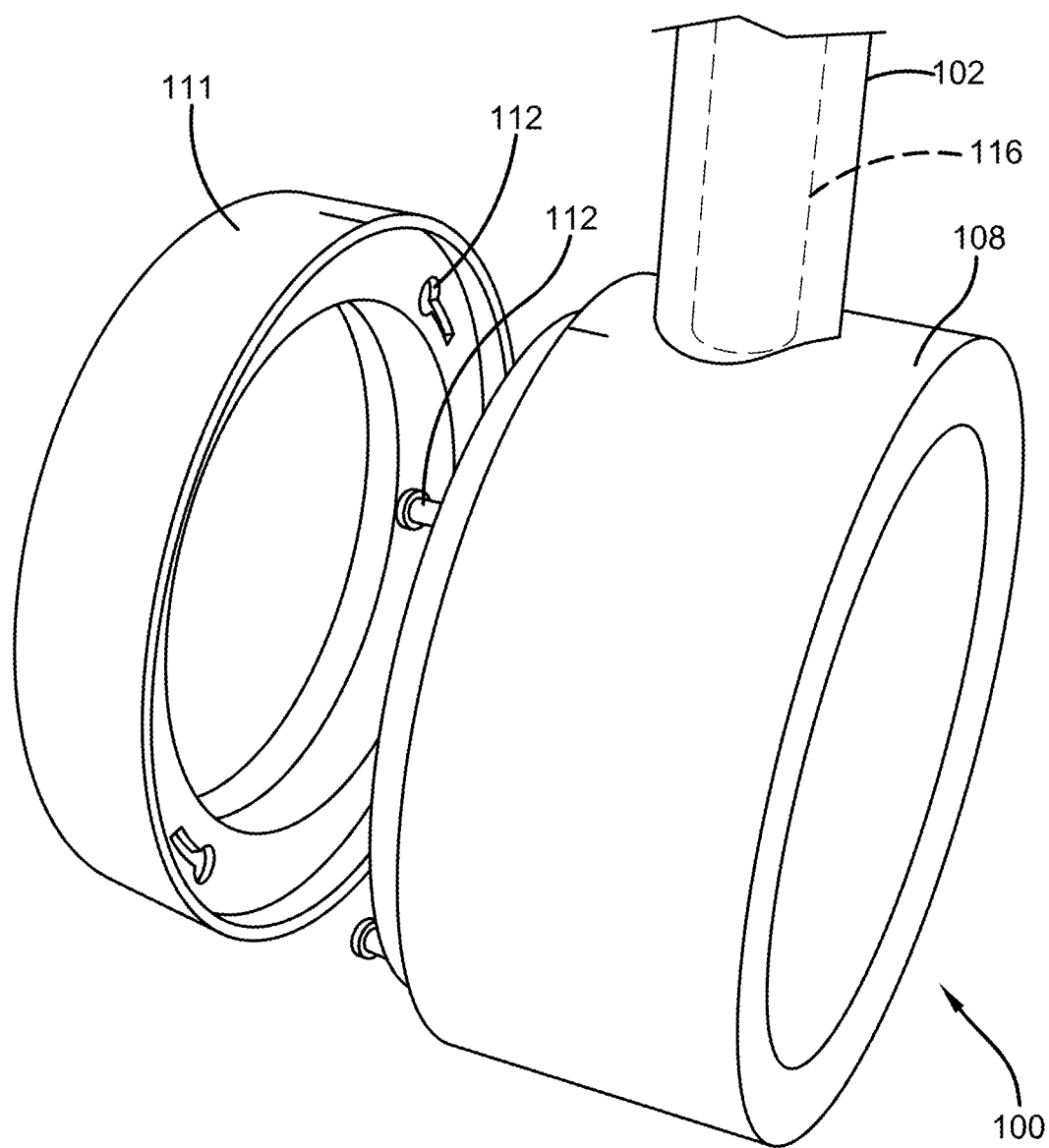
FIG. 1 illustrates a perspective view of one potential embodiment of a dryer vent output hose attachment device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a dryer vent output hose attachment device that enables secure hose-to-dryer connections without requiring users to access the space behind the appliance. There also exists a long-felt need in the art for a dryer vent output hose attachment device that reduces the physical strain and injury risk associated with traditional dryer hose installations. Moreover, there exists a long-felt need in the art for a dryer vent output hose attachment device that ensures reliable airflow by minimizing the occurrence of hose kinks during repositioning of the dryer.

The present invention, in one exemplary embodiment, is comprised of a dryer vent output hose attachment device. The dryer vent output hose attachment device is a manually operated tool configured to facilitate the connection of a flexible dryer vent hose to a vent port located on the rear of a dryer, particularly in recessed or obstructed installation environments. This device allows the user to perform the hose connection from a more accessible location, such as the front or side of the dryer, thereby reducing the need for awkward body positioning.

The device is comprised of a handle designed to transmit controlled, linear force. This handle is connected to an angular adapter that redirects the applied force perpendicularly to the handle's axis, enabling alignment and connection of the vent hose without requiring access to the rear of the appliance. The adapter is configured to engage with an attachment point fixed to the terminal end of the vent hose, with both components dimensioned to be compatible with standard hose sizes.

The ergonomic configuration of the handle and adapter allows the user to maneuver and complete the hose connection while remaining in a standing or kneeling position. The adapter can be aligned with the fixed attachment point on the hose and securely connected without the need to reposition behind the dryer.

The securement between the adapter and the attachment point is achieved using a reciprocating fastening mechanism. This mechanism may include bayonet-style connections, magnetic couplers, spring-loaded latches, threaded collars, snap-fit clips, or other tool-free engagement systems engineered to provide secure and repeatable attachment.

The invention further includes a method of operation comprising steps such as affixing the adapter to the dryer vent port, grasping and extending the handle if necessary, maneuvering the adapter to align with the hose's attachment point, securing the connection, repositioning the dryer, and optionally detaching the handle in configurations where the handle is removably attached.

As a result, the dryer vent output hose attachment device provides a practical solution that enables a user to attach a dryer vent hose from a convenient and accessible position at the front or side of the dryer while effectively aligning and securing the hose connection. The use of reciprocating fastening mechanisms, such as snap connectors or magnets, ensures a dependable and user-friendly interface between the hose and the vent port. This device enhances safety, improves installation efficiency, and helps prevent airflow obstructions or improper hose connections.

Referring initially to the drawings, FIG. 1 illustrates a perspective view of one potential embodiment of a dryer vent output hose attachment device 100 of the present invention in accordance with the disclosed architecture. The dryer vent output hose attachment device 100 is a manually operated tool configured to facilitate the attachment of a flexible dryer vent hose 10 to a dryer vent port 12 located on a dryer 14, particularly in confined, recessed, or obstructed spaces. The device 100 enables the user to perform the attachment from a more accessible vantage point, such as the front or side of the appliance, minimizing the need to reach behind the dryer 14 or assume an awkward position.

Figure 4:
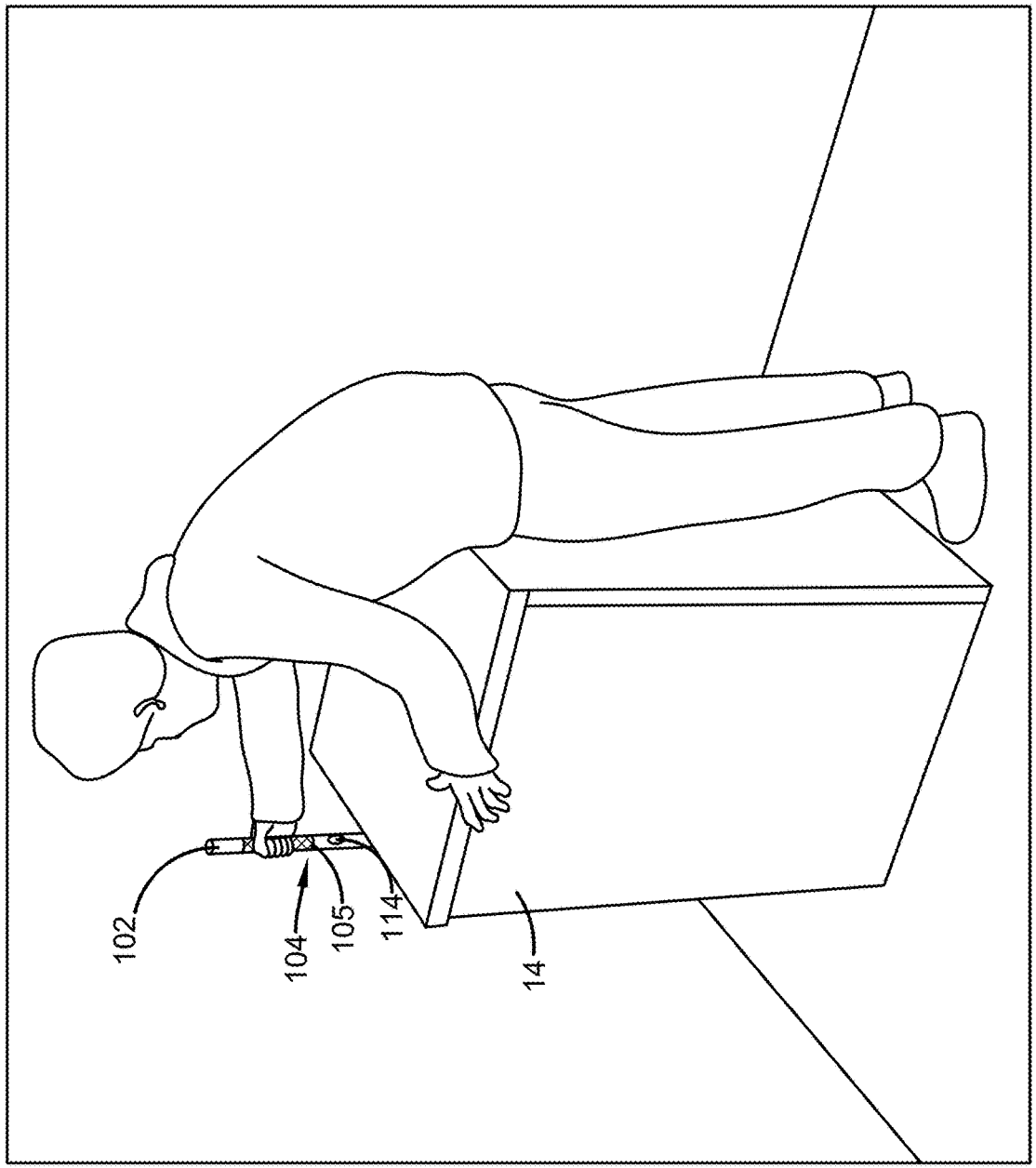
FIG. 4 illustrates a perspective view of one potential embodiment of a dryer vent output hose attachment device of the present invention with a use of gripping the handle in accordance with the disclosed architecture.

The device 100 is comprised of a handle 102 made from rigid plastic. In the preferred embodiment, the handle 102 is straight to support linear force transfer and simplifies user control. The handle 102 is configured for ergonomic grasping and may optionally feature a grip area 104 comprised of at least one texture 105, as seen in FIG. 4. The grip area 104 may be comprised of molded or over-molded materials such as, but not limited to, thermoplastic elastomer, silicone rubber, or knurled thermoplastic resin. The textures 105 may include, but are not limited to, stippling, ribbing, cross-hatching, checkering, diamond-pattern knurling, wave patterns, pebble grain textures, sharkskin-like micro texturing, or contoured ridges to improve grip security under various hand conditions, including moisture or glove use.

Figure 2:
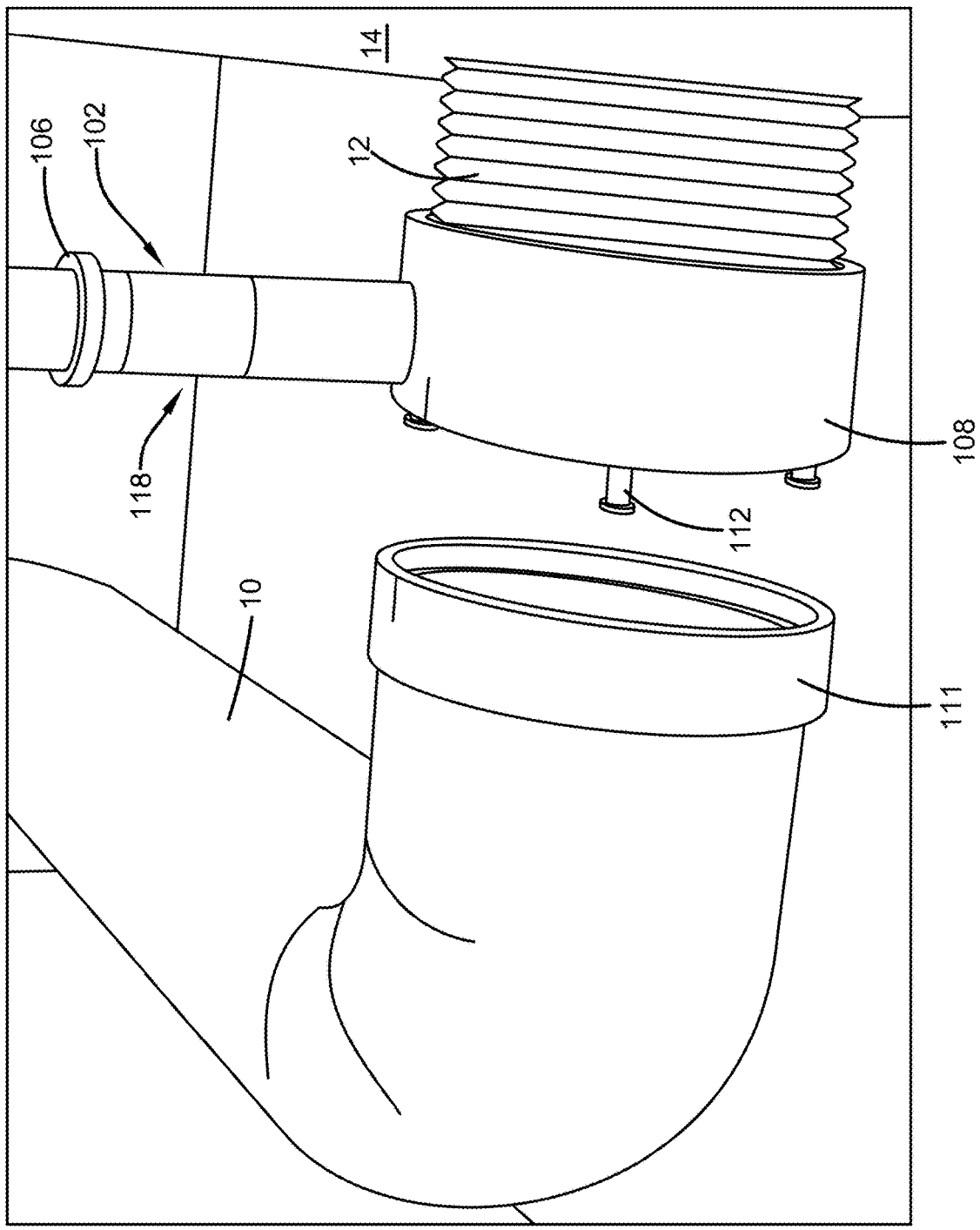
FIG. 2 illustrates a side perspective view of one potential embodiment of a dryer vent output hose attachment device of the present invention with the attachment point and adapter unattached in accordance with the disclosed architecture.
Figure 3:
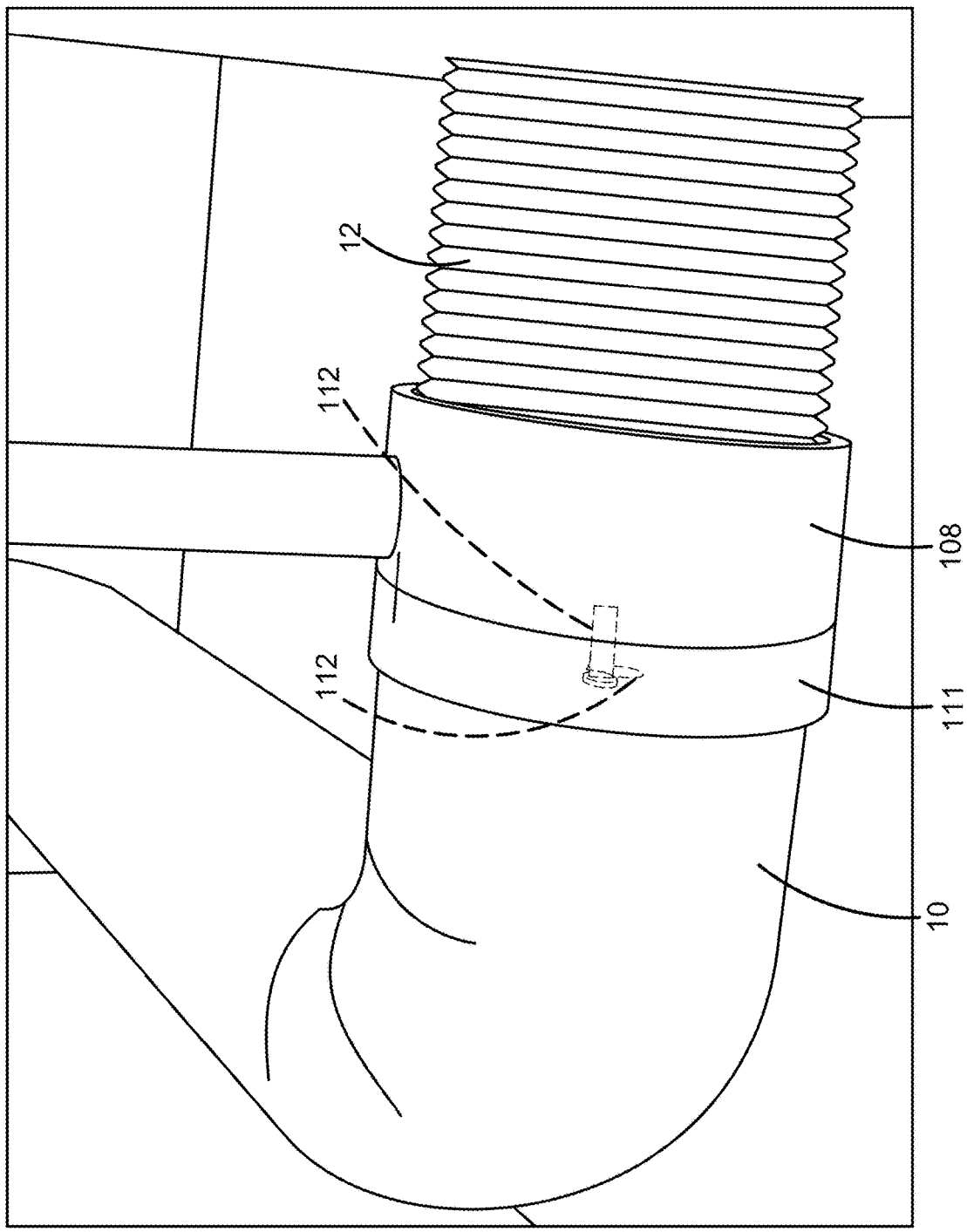
FIG. 3 illustrates a side perspective view of one potential embodiment of a dryer vent output hose attachment device of the present invention with the attachment point and adapter attached in accordance with the disclosed architecture.

The handle 102 is secured to an angle adapter 108 that is preferably angularly configured to redirect the insertion force along an axis perpendicular to the handle 102, facilitating engagement with a hose 10 while the user remains positioned in front of or beside the dryer 14, as seen in FIG. 4. More specifically, the adapter 108 is preferably fixedly attached to the port 12 and is configured to engage with an attachment point 111 that is permanently affixed to the terminal end of the dryer vent hose 10, as seen in FIG. 2 and FIG. 3. The attachment point 111 serves as the fixed interface component that remains connected to the hose 10, allowing the adapter 108 to mate with the point 111 to connect the hose 10 to the port 12. The adapter 108 may be any diameter to match standard vent hose sizes.

The handle 102 and adapter 108 are configured to allow the user to push the dryer 14 back into a tight installation space while maintaining a comfortable standing or kneeling position, as seen in FIG. 4. By holding the handle 102, the user can maneuver the adapter 108 into position and align and attach the adapter 108 to the attachment point 111 affixed to the hose 10, securing the hose 10 to the dryer vent port 12 without accessing the rear of the appliance.

Once the adapter 108 is aligned with the attachment point 111, the connection is secured via a reciprocating fastening mechanism 112 found on both the adapter 108 and the attachment point 111, as seen in FIG. 3. The fastening mechanism 112 may include, but is not limited to, a slip-and-twist bayonet-style interface, magnetic couplers such as embedded neodymium magnets, spring-loaded latch systems, threaded locking collars, quarter-turn cam-lock mechanisms, friction-fit couplers, snap-fit tabs and clips, lever-actuated clamps, rotating hook-and-slot connectors, over-center toggle latches, ratcheting engagement collars, dual-lock interlocking rails, compression-seal rings, or flexible tab-and-slot locks. Each configuration is intended to provide a secure, user-friendly connection between the adapter 108 and the attachment point 111, enabling efficient installation and removal without tools.

As a result, the device 100 eliminates the need for the user to be positioned directly behind the dryer 14 or to lie on top of the appliance during installation. The combination of the extended reach provided by the handle 102 and the maneuverability of the adapter 108 allows the connection process to be completed with the dryer 14 nearly or fully in its final position.

In one embodiment, the handle 102 may be comprised of telescoping segments 118, enabling adjustable length to accommodate deeper installation environments. A locking mechanism 106 may be incorporated to secure the handle 102 at the desired extension. The mechanism 106 may include, but is not limited to, spring-loaded pins, twist-lock collars, or cam levers, etc.

In one embodiment, the handle 102 is fixedly attached to the adapter 108. In another embodiment, the handle 102 is removably attached to the adapter 108. In this embodiment, the handle 102 can be detached from the adapter 108 after the hose 10 is secured to the vent 12. To accomplish this, at least one release mechanism 114 may be included that removably connects handle 102 to the adapter 108. The mechanisms 114 actuates an internal latch mechanism 116 (as seen in FIG. 1), such as a retractable pin, sliding tab, or pivoting catch, allowing the handle 102 to be removed from the adapter 108 while the adapter 108 remains connected to the attachment point 111.

Figure 5:
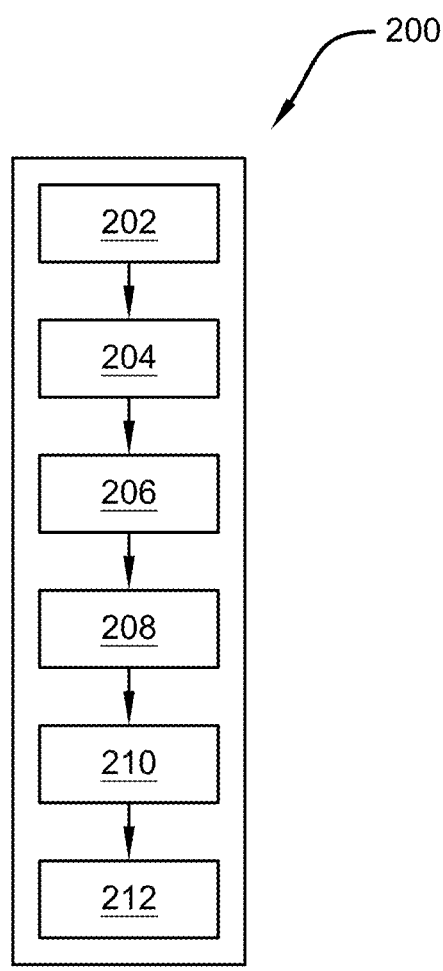
FIG. 5 illustrates a flowchart of a method of using one potential embodiment of a dryer vent output hose attachment device of the present invention in accordance with the disclosed architecture.

The present invention is also comprised of a method of using 200 the device 100, as seen in FIG. 5. First, a device 100 is provided comprised of a handle 102, an angle adapter 108, and optionally at least one telescoping segment 118 with a locking mechanism 106, and a release mechanism 114 operably connected to a latch mechanism 116 [Step 202]. Next, the user may grasp the handle 102 from a position in front of or beside the dryer 14 and extend the handle 102 if necessary to accommodate the installation depth, securing the extension with the locking mechanism 106 if present [Step 204]. Then, the user then maneuvers the handle 102 to align the adapter 108 with the attachment point 111 affixed to the terminal end of the flexible dryer vent hose 10 [Step 206]. Once aligned, the adapter 108 is engaged with the attachment point 111 to connect the hose 10 to the vent port 12, wherein the connection is secured using the reciprocating fastening mechanism 112. Then, the user may push the dryer 14 into its final installation position while maintaining control of the handle 102 [Step 208]. Finally, if the handle 102 is removably attached, the user may actuate the release mechanism 114 to disengage the latch mechanism 116 and remove the handle 102 from the adapter 108 while the adapter 108 remains connected to the attachment point 111 [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "dryer vent output hose attachment device" and "device" are interchangeable and refer to the dryer vent output hose attachment device 100 of the present invention.

Notwithstanding the foregoing, the dryer vent output hose attachment device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the dryer vent output hose attachment device 100 as shown in the FIGS. are for illustrative purposes only, and that many other sizes and shapes of the dryer vent output hose attachment device 100 are well within the scope of the present disclosure. Although the dimensions of the dryer vent output hose attachment device 100 are important design parameters for user convenience, the dryer vent output hose attachment device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A dryer vent output hose attachment device comprising:
a handle;
an angle adapter fixedly attached to the handle, the angle adapter configured to redirect an insertion force along an axis perpendicular to the handle; and
an attachment point affixed to a dryer vent hose, wherein the angle adapter is configured to engage with the attachment point via a pair of reciprocating fasteners to connect the dryer vent hose to a dryer vent port located on a dryer.

2. The dryer vent output hose attachment device of claim 1, wherein the handle is comprised of a grip area.

3. The dryer vent output hose attachment device of claim 2, wherein the grip area is comprised of a thermoplastic elastomer, a silicone rubber, or a knurled thermoplastic resin.

4. The dryer vent output hose attachment device of claim 2, wherein the grip area is comprised of a texture.

5. The dryer vent output hose attachment device of claim 4, wherein the texture is comprised of a stippling, a ribbing, a cross-hatching, a checkering, a diamond-pattern knurling, a wave pattern, a pebble grain texture, a micro texturing, or a contoured ridge.

6. The dryer vent output hose attachment device of claim 1, wherein the handle is comprised of a telescopic handle.

7. The dryer vent output hose attachment device of claim 6, wherein the handle is comprised of a locking mechanism.

8. The dryer vent output hose attachment device of claim 1, wherein the pair of reciprocating fasteners are comprised of a slip-and-twist bayonet-style interface, a magnetic coupler, a spring-loaded latch system, a threaded locking collar, a cam-lock mechanism, a friction-fit coupler, a snap-fit tab and clip, a lever-actuated clamp, a rotating hook-and-slot connector, an over-center toggle latch, a ratcheting engagement collar, a dual-lock interlocking rail, a compression-seal ring, or a flexible tab-and-slot lock.

* * * * *